July 28, 1925.

E. T. FERNGREN

GLASS FURNACE

Filed Feb. 19, 1923    2 Sheets-Sheet 1

1,547,911

INVENTOR
Enoch T. Ferngren
BY C. A. Rowley
ATTORNEY

July 28, 1925. 1,547,911

E. T. FERNGREN

GLASS FURNACE

Filed Feb. 19, 1923   2 Sheets-Sheet 2

INVENTOR
Enoch T. Ferngren
BY C. A. Rowley
ATTORNEY

Patented July 28, 1925.

1,547,911

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

GLASS FURNACE.

Application filed February 19, 1923. Serial No. 619,861.

*To all whom it may concern:*

Be it known that I, ENOCH T. FERNGREN, a citizen of Sweden, residing at Toledo, in the county of Lucas and State of Ohio, have invented new and useful Improvements in Glass Furnaces, of which the following is a specification.

This invention relates to improvements in the furnace construction of sheet glass drawing machines, and more particularly to an improved form of supporting and heat distributing means for the draw-pot which contains the molten glass from which the sheet is drawn.

In a sheet glass drawing apparatus of the type substantially set forth in the patent to I. W. Colburn, 1,248,809, granted December 4, 1917, the molten glass from which the sheet is drawn is carried in a shallow receptacle or draw-pot, positioned over a heating chamber which maintains the glass at the proper drawing temperature. Since these pots have a considerable horizontal area, and the refractory clay of which they are formed does not have a very high tensile strength, supports for the central portions of the pot must be provided within the heating chamber, these supports usually being in the form of separate silica stools or arches which allow the heating gases to pass therebetween. This structure is substantially disclosed in the patent to Colburn referred to above. This has resulted in an unequal heating of the clay within the pot, there being cooler areas above the contact points of the supporting stools and hotter areas therebetween caused by the direct contact of the heated gases at these points. These silica stools are rather poor conductors of heat, and the refractory material of which the draw-pot is composed is also a rather slow conductor so that the different temperature conditions existing in the bottom of the pot are not materially evened-out or diffused in the pot structure but are passed on to the molten glass thereabove. Since the sheet is drawn from the pot on a line parallel to the series of supporting stools, there will sometimes result alternate hotter or cooler areas across the width of the sheet causing corded or striated areas in the finished product.

The object of the present invention is to avoid this unequal heating of the molten glass within the pot and the consequent inequalities in the glass sheet. This is accomplished by supporting the pot upon a plate or slab of silicon-carbide, or other structurally stable carbide, which has sufficient strength to carry the pot structure when supported adjacent its edges only, the intermediate column of stools or other supports being eliminated, leaving the entire central portion of the pot exposed to the heated gases in the furnace or chamber beneath the pot. This silicon-carbide plate also has a very high thermal conductivity and helps to diffuse the heat passing therethrough to the pot in such a way as to eliminate the zones of heat of somewhat varying intensity that may be formed in the furnace by the row of separate burners which project the heating gases into the furnace chamber.

The objects and advantages of this invention will be better understood from the following detailed description of two approved forms of furnace construction embodying the principles of this invention.

Figure 1:
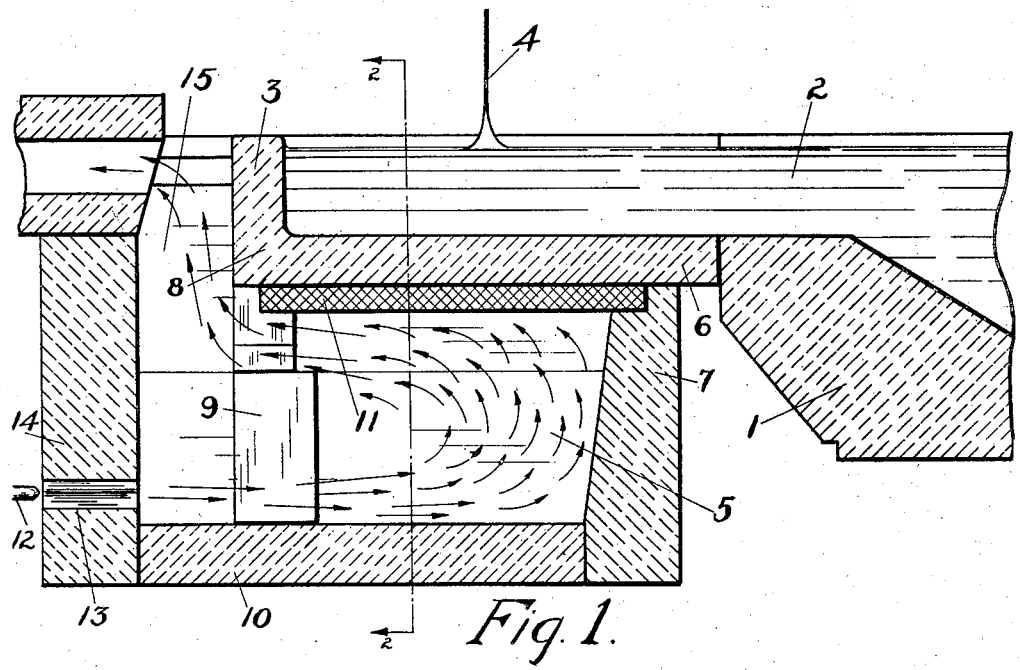
Fig. 1 is a longitudinal vertical section through the draw-pot and heating chamber, taken substantially on the line 1—1 of Fig. 2.
Figure 2:
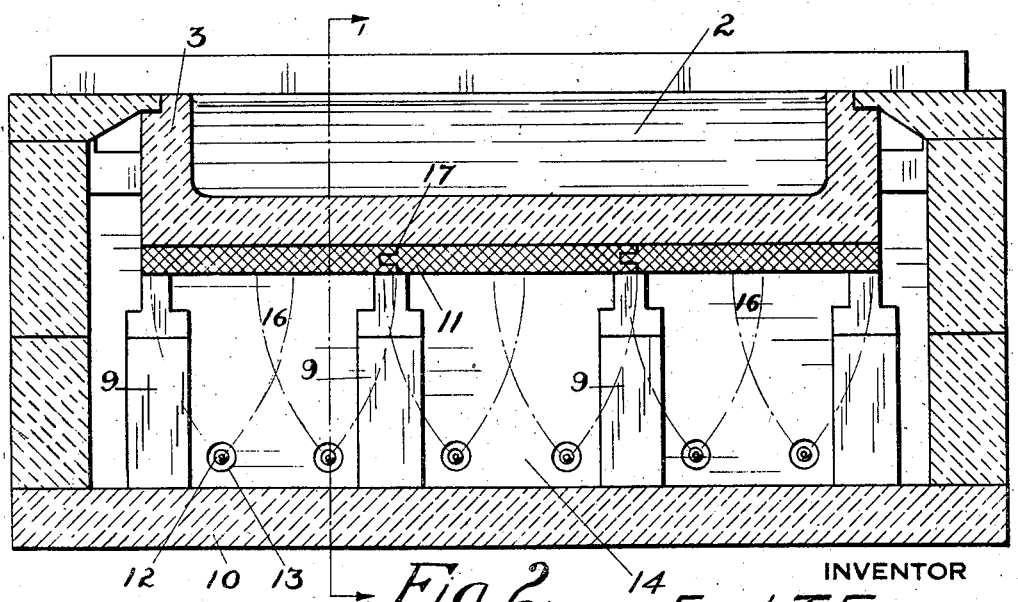
Fig. 2 is a transverse vertical section through the same, taken substantially on the line 2—2 of Fig. 1.

Referring first to Figs. 1 and 2, at 1 is shown the delivery end of a continuous tank furnace or other source of supply for the molten glass 2, which flows directly into the open end of the shallow draw-pot or receptacle 3. The sheet of glass 4 is drawn upwardly from the molten glass 2 in the pot by any approved apparatus such as that disclosed in the Colburn patent referred to above. It will be understood that the draw-pot and the improved supporting means may be used with many other systems of drawing sheet glass than the one here indicated.

The pot 3 is mounted above a furnace or heating chamber 5, the rear edge 6 of the pot being carried by the rear wall 7 of this chamber, whereas the front edge 8 is supported by a row of posts or stools 9 rising from the bottom 10 of the furnace chamber. The drawpot 3, which is molded from refractory clay or some similar material, has not sufficient tensile strength to bridge the gap between the wall 7 and the posts 9 and carry the load of glass 2 contained in the pot. For this reason, an intermediate row of stools or supports, such as 9, have been used in previous constructions. These intermediate posts not only form cooler areas at their places of contact with the bottom of the pot but also split up the furnace chamber 5 into a series of separate zones or compartments, and interfere with the proper mingling or diffusion of the heated gases within the furnace chamber. In the present construction, this intermediate row of posts is eliminated and a slab or plate 11 of a silicon-carbide material is used to span the roof of chamber 5 between the rear wall 7 and the stools or posts 9. The draw-pot 3 rests directly upon this plate or slab 11 of silicon-carbide which material is of high tensile strength and will remain absolutely rigid and carry the pot and glass contained therein without sagging under the heat conditions prevalent in the chamber 5.

The silicon-carbide material here used will be a bonded granular structure of carborundum or a compact recrystallized body of carborundum. Preferably, the grains used in forming the carborundum slabs should be of rather coarse screening and of uniform size, as a too fine or variable granular structure would tend to produce strains in the material, and a zircon silicon-carbide bond would provide the best agglutinant for the granular material in the bonded article. However, a recrystallized body of granular silicon-carbide is preferred, where the grains are united in a very rigid bond by an intergrowth of interlocking silicon-carbide crystals which makes a very rigid and strong material having no bending point under any temperature in which the material may exist without breaking down. The outer surface of the plate 11 may be coated with silica to prevent spalling or flaking of the plate.

The chamber 5 is heated by a series of spaced burners 12 which project their flames through apertures 13 in the rear wall of the furnace structure. The flames from these burners pass between the posts 9 across the chamber 5 to the rear wall 7, are thence deflected upwardly against the plate 11 forming the roof of the chamber, and thence back beneath this plate, the spent gases and other products of combustion being drawn out through the passage or flue 15, substantially as indicated by the arrows in Figs. 1 and 3.

The removal of the center line of stools under the pot will provide a clear open space for the play of these flames from the various burners, and thus promote a more thorough mixing of their fringes of combustion so that there will be a more uniform distribution of the heat units released to the plate 11 as the heating gases sweep along the bottom of the pot on their journey through the furnace chamber.

Figure 4:
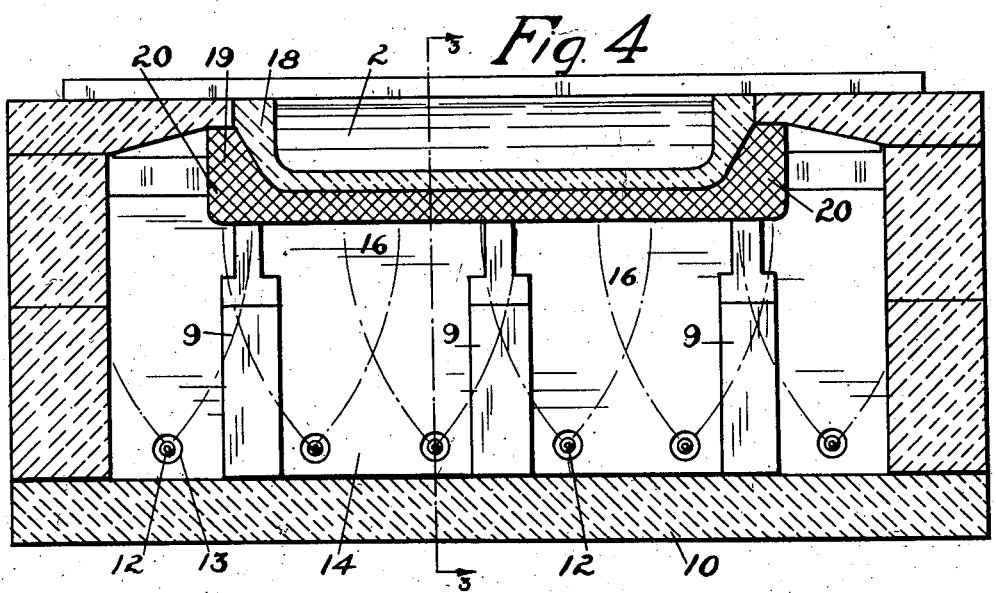
Fig. 4 is a transverse vertical section taken substantially on the line 4—4 of Fig. 3.

The separate flames projected from the several burners 12 expand or spread out during their passage through the furnace chamber, and the outer envelopes of the adjacent flames where the combustion is the best and the heat the greatest commingle to form intermediate areas of slightly higher temperature as indicated at 16 in Figs. 2 and 4. However, since the silicon-carbide plate has a very high thermal conductivity these slight variations in the heat applied to different areas of the lower face of the plate will be distributed or diffused as the heat passes therethrough to the pot structures so that a practically even and uniform flow of heat will be imparted to and through the pot 3 to the molten glass 2.

Since the draw-pots 3 are often made quite wide, it may not be practicable in all cases to make a single silicon-carbide plate of sufficient area to underlie the entire lower face of the pot. In such cases, the slab or support may be built up of a series of separate plates interlocked together as indicated at 17 (Fig. 2), the joints being preferably made secure by a carborundum cement.

Figure 3:
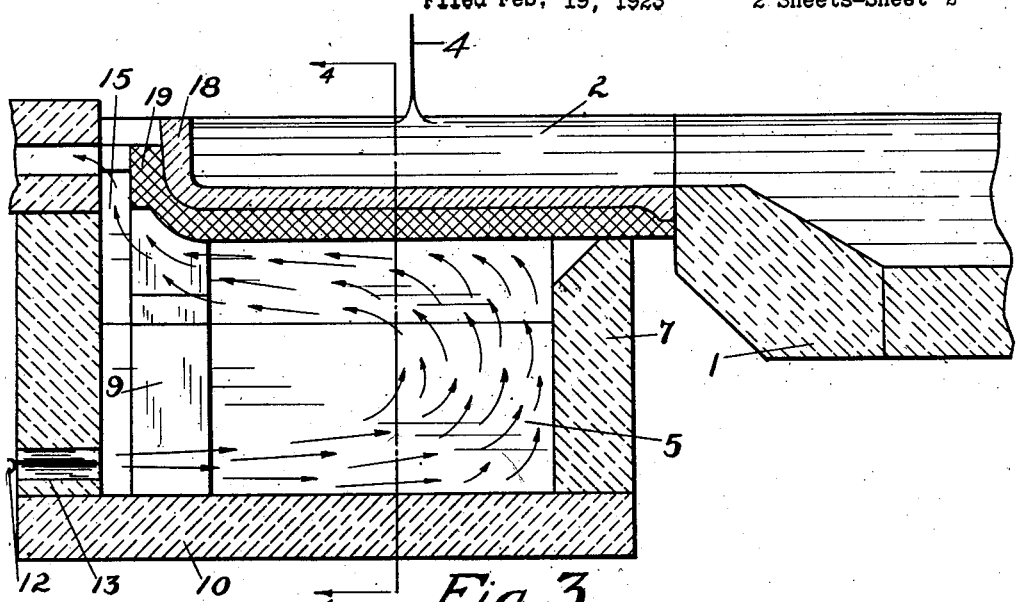
Fig. 3 is a longitudinal vertical section similar to Fig. 1, through a different modification. This view is taken substantially on the line 3—3 of Fig. 4.
Figure 5:
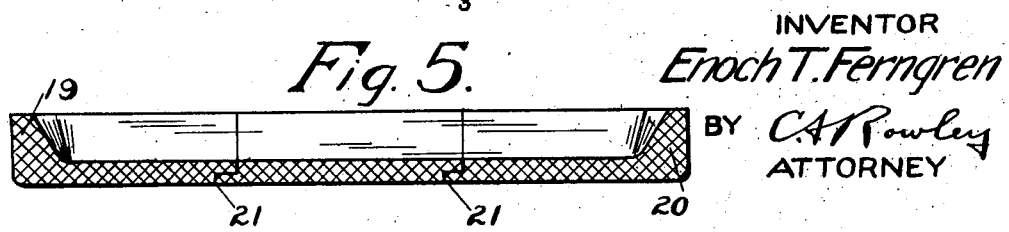
Fig. 5 is a transverse vertical section through the carbide supporting shell, showing how this shell may be built up of a series of separate sections or plates.

In Figs. 3, 4 and 5, a somewhat different application of the principles of this invention is illustrated. In this case, the carbide supporting plate is embodied in the structure of the draw-pot itself. The pot is composed of an inner glass-containing shell 18 of refractory clay or similar material and an outer supporting shell 19 of silicon-carbide. This outer shell 19 rests upon the rear wall 7 of the furnace chamber and the supporting stools 9 much the same as plate 11, shown in Figs. 1 and 2. The two shells 18 and 19 are separately constructed, and the shell 19 will be made somewhat larger than the shell 18 to allow for the greater expansion of the clay shell when heated to the temperatures under which this apparatus operates. This double pot structure will function much the same as the pot 3 and plate 11, already described in connection with Figs. 1 and 2. The side flanges 20 on the outer shell 19 will more thoroughly diffuse the heat at the side edges of the pot than in the previously described construction.

The outer shell 19 may be formed in separate sections joined or cemented together at 21, as illustrated in Fig. 5.

Claims:

1. In a glass working machine, a container for molten glass, comprising a lining of refractory clay, and an outer supporting shell of silicon-carbide.

2. In a sheet glass drawing apparatus, a pot for the molten glass from which the sheet is drawn, in combination with a heating furnace beneath the pot, and a plate of silicon-carbide of substantially the same dimensions as the pot bottom supporting the pot, the plate being mounted at its edges on the furnace structure, and its entire central portion being unsupported and exposed to the heating gases in the furnace.

3. In a sheet glass drawing apparatus, a pot for the molten glass from which the sheet is drawn, comprising an inner glass-holding shell of refractory clay, and an outer supporting shell of silicon-carbide.

4. In a sheet glass drawing apparatus, a pot for the molten glass from which the sheet is drawn, comprising an inner glass-holding shell of refractory clay, and an outer supporting shell of silicon-carbide, in combination with a heating furnace beneath the pot, the edges of the outer shell being supported on the furnace structure, while the entire central portion is unsupported and exposed to the heated gases in the furnace.

5. In a pot-supporting structure for a sheet glass drawing machine, a silicon-carbide plate of substantially the same dimensions at the pot bottom, and means for supporting the plate adjacent its edges only.

6. In a sheet-glass drawing furnace construction, a draw-pot of a refractory clay composition containing the molten glass, a silicon-carbide plate extending under said pot to support the same, and suitable refractory members on which the slab rests along its border portions, the central portions of the plate being unsupported.

7. In a sheet-glass drawing apparatus, a pot structure from which a sheet of glass may be drawn, in combination with a heating furnace and a slab of refractory material supported from the furnace structure for supporting the border portions of said pot above the heating space of said furnace, said heating space being open and unobstructed beneath said slab to promote the free movement of heating media therethrough.

8. In the art of drawing sheet glass, the method of transmitting heat to the glass which is under tractive stress in the draw-pot, which consists in transmitting the heat which is produced by a series of overlapping zones of combustion through the walls of the draw-pot and the glass therein by an intermediate material of silicon-carbide for the purpose of locally equalizing the variable ratios in velocity and volume of heat penetration.

9. The method of transmitting heat to a body of glass from which a sheet is being drawn, which consists in applying the heat which is being supplied to said body from a heating space therebeneath, first, to a material having a high rate of conductivity, thence to a material of relatively slow conductivity, and thence to the glass for the purpose of promoting equal distribution of heat to the substratums in the body of glass under drawing stress.

10. The method of equalizing the flow of heat units into the substratums of a body of glass in a draw-pot from which a sheet is being drawn, which consists in forming an approximately uniform column of heat in a heating chamber beneath the pot, by transfusing the borders of a series of separate zones of combustion and by passing said heat through a uniformly graded and spaced material of high thermal conductivity in its transit toward the pot.

11. A pot for use in sheet glass apparatus, comprising an inner refractory material portion for contact with the glass, and an outer shell of silicon-carbide for supporting the inner portion and for conducting heat uniformly to the inner member and glass contained therein.

Signed at Toledo, in the county of Lucas, and State of Ohio, this 17th day of February, 1923.

ENOCH T. FERNGREN.